Nov. 3, 1936.  H. R. HUSTAD  2,059,641
MOTOR SPEED EQUALIZER
Filed Dec. 9, 1931
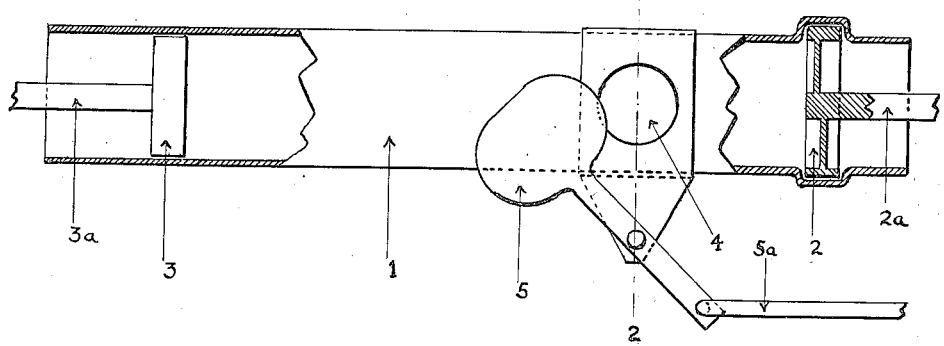
Fig. 1.
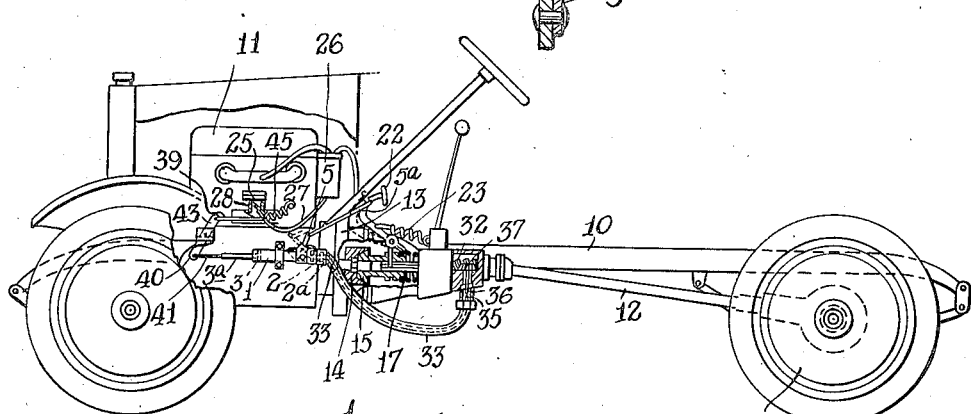
Fig. 2.
Fig. 3.
Inventor
Hugo Rudyard Hustad Patented Nov. 3, 1936

2,059,641

UNITED STATES PATENT OFFICE 2,059,641

MOTOR SPEED EQUALIZER

Hugo Rudyard Hustad, New York, N. Y., assignor of one-half to Warren M. Florance, Bethlehem, Pa.

Application December 9, 1931, Serial No. 579,905

14 Claims. (Cl. 192—.01)

My invention consists of the combinations, and arrangements herein described and claimed.

An object of my invention is to construct a device which will automatically increase the rate of revolutions of a motor in a motor driven vehicle, when said motor is being engaged to function with the forward movement of said vehicle and with parts already operating as a result of said forward movement, so that said motor and said parts are revolving at identical rates before said engagement is definite, thus eliminating all friction between said motor and said parts so engaged. Only the highly skilled driver with great caution can so adjust the speed of the motor, when causing the motor to be engaged with the forward movement of the vehicle, as to eliminate the larger portion of the usual friction.

A further object of my invention is to reduce the strength required of the parts used in engaging and disengaging the motor with and from the forward movement of a motor driven vehicle, and thus reduce the cost of such parts, by eliminating the strain on such parts caused by the friction involved in engaging the motor with the forward movement of the vehicle.

Other objects and advantages will appear in the following specification, and novel features of my invention will be particularly pointed out in the appended claims.

My invention is illustrated in the accompanying drawing, forming a part of this application, in which like figures indicate like parts, and in which Figure 1 shows a side view of my invention with portions of the tube broken away at the propeller and at the plunger, and a portion of the propeller broken away, Figure 2 shows a cross section of Figure 1, substantially along the line 2—2, and Figure 3 shows the invention with its associated controls in an assembled view on an automobile structure.

In carrying out my invention I provide the tube 1, Figure 1, the propeller 2 placed in one end of tube 1, the plunger 3 sliding in the opposite end of tube 1, and the opening 4 placed between the propeller 2 and the plunger 3, said opening 4 to be left open or cause to be closed by valve 5. The propeller 2 is connected by rod 2a and by any suitable means such as a cable-enclosed chain used for speedometers, and to any revolving part of the vehicle, such part being caused to revolve by the forward movement of the vehicle, irrespective of the revolutions of the motor. The blades of propeller 2 are placed to cause a suction in tube 1 when said propeller 2 is revolving. The plunger 3 is connected by rod 3a, and any other rods and/or wires necessary, to the fuel-feed-valve of the motor. Valve 5 is connected with and operated by any part, such as the clutch pedal, which is used to engage the motor with or to disengage the motor from the forward movement of the vehicle.

Referring to Figure 3, I show a motor driven vehicle 10, having a motor 11 mounted thereon which is adapted to be operatively connected to the drive shaft 12 thereof through means comprising the clutch 13. The clutch 13 comprises the motor driven member 14, which is shown operatively connected to the crank shaft of the motor 11, and is adapted to revolve therewith upon operation of the motor, and the movable clutch member 15 which is operatively connected to the drive shaft 12 through suitable means comprising the splined shaft 17. The clutch member 15 is operatively connected in driving relation with the wheels 18 of the vehicle through well-known means, comprising the differential and axles. The clutch member 15 is adapted to rotate with the shaft 17 and is also adaptable for slidable movement thereon into and out of engagement with the clutch member 14 to bring the motor 11 into and out of driving relation with the vehicle 10. In the drawing I show a clutch pedal 22 operatively connected to the member 15 which is adapted upon depression to move the clutch member 15 away from the member 14. I also show a spring 23 to move the clutch member 15 into engagement with the clutch member 14 upon the release of the clutch pedal 22 after it has been depressed, and also to retain the clutch members in operative engagement. A carburetor 25 is provided to supply fuel to the motor 11 from the fuel tank 26 by means of the pipe 27. A valve 28 is provided to control the supply of fuel to the motor 11. A portion of the carburetor is shown cut away to show the valve 28. A lever 30 is provided to control the fuel-feed valve 28.

My invention is shown applied to the vehicle by the bracket 31, which engages the tube 1, but it may be applied by any other suitable means. The propeller 2 is shown operatively connected to the gear 32 which is fixedly mounted on the shaft 12 and rotatable therewith through the medium of the rod 2a, the flexible cable 33, which has its end 34 connected to the rod 2a and its end 35 connected to shaft 36 upon which is fixedly mounted the gear 37 so that it will revolve with the shaft 36. The gear 37 is mounted in meshed relation with the gear 32. Therefore the rotation of the drive shaft 12 will rotate the propeller 2 through the medium of the parts just described. The plunger 3 is operatively connected to the fuel-feed valve lever 30 through the medium of the rod 3a, the members 39, 40 and 41. The member 40 is pivotally mounted at 42 on a bracket 43 which is attached to the vehicle. The members 39 and 41 are preferably flexible so as to permit the lever 30 to be operated under certain conditions without moving the plunger 3, as the lever 30 is to be operatively connected to the usual operating devices, such as the throttle lever, accelerator, etc. The valve 5 is shown connected to the clutch pedal 22.

In operation, assuming that the clutch pedal 22 is in the depressed position shown in broken lines in Figure 3; that the vehicle 10 is moving forward under its own momentum; that the motor is "idling" and is disconnected from driving relation with the vehicle 10, due to the clutch member 15 being disengaged from the clutch member 14, having been previously disengaged during the movement of the clutch pedal 22 to its depressed position; that the throttle or fuel-feed valve is in the position shown in Figure 3; the clutch member 15 and the propeller 2 are rotating, due to their being operatively connected to the drive shaft 12; the valve 5 is positioned to the rear of the opening 4 in the tube 1, due to the depression of the clutch pedal 22 having previously moved the lever 5a and the end of the valve to which the lever is connected to the position shown in broken lines in Figure 3; and it is desired to connect the motor into driving relation with the vehicle; the clutch pedal 22 is permitted to move towards the position shown in full lines in Figure 3. During this movement the rod 5a, which is connected to the valve 5, operates the valve 5 to cover the opening 4, this causes the suction in the tube 1 created by the rotation of the propeller 2, which is designed so that it will create a suction in the tube when it is revolved, to draw the plunger 3 towards the propeller 2, the distance the plunger is moved depending upon the speed of the propeller 2 which is controlled by the speed of the vehicle. The movement of the plunger 3 towards the propeller 2 operates the fuel-feed valve 28 towards its open position and therefore causes additional fuel to be supplied to the motor to increase the speed thereof so that the speed of the clutch member 14 will synchronize with the speed of the clutch member 15 which is being driven by the vehicle. Further movement of the pedal in the same direction will cause the clutch members to be connected without shock on the clutch or the vehicle. Still further movement of the clutch pedal in the same direction will cause the clutch members to be firmly engaged and will also cause the valve 5 to uncover the opening 4 in the tube 1. The suction created by propeller 2 is now rendered inoperative on the plunger 3 which in turn is rendered inoperative on the fuel-feed valve 28 due to the action of the spring 45, which is provided to urge the valve to closed position, on the lever 30, and the motor is in condition to be operated to any desired speed by the usual mechanism and controls provided for that purpose which are well-known in the art.

I claim:

1. Means for automatically using the forward movement of a motor driven vehicle to increase the rate of revolutions of its motor, and/or parts being revolved by said motor, said increased rate of revolutions to coincide and be identical with the rate of revolutions of such parts as are caused to revolve by the forward movement of said vehicle and are used to engage said motor with said forward movement of said vehicle, while said motor, and/or parts being revolved by said motor, and said such parts as are caused to revolve by said forward movement of said vehicle are being engaged to function together, said means comprising an element adapted to be driven by the vehicle independently of the motor, an element operatively connected to means for controlling the speed of the motor and a controlling element for said means adapted to be operated by means operated to engage said motor with the forward movement of said vehicle.

2. A device of the type described for a motor driven vehicle comprising a tube, a propeller rotatably mounted within said tube adapted to be driven by the forward movement of said vehicle, the revolving of said propeller creating a suction in said tube, a plunger within said tube adapted to be drawn toward said propeller by the suction created in the tube by the propeller, said plunger being connected operatively with the fuel-feed-valve of said motor.

3. In combination with a vehicle, a motor for driving said vehicle, means for engaging said motor with and disengaging said motor from driving relation with said vehicle, a control for said means, a fuel-feed valve for said motor, a synchronizing device comprising a tube, a propeller and a plunger within said tube, and an opening in said tube between said propeller and said plunger, and means for closing said opening; said propeller revolved by the forward movement of said vehicle; said means for closing said opening connected with and operated by the aforementioned control used to engage said motor with or disengage said motor from driving relation with said vehicle; and said plunger actuated by the revolving of said propeller when said opening is caused to be closed, and said plunger operatively connected with the fuel-feed-valve of said motor.

4. A device of the type described for a motor driven vehicle having a disengagable means for connecting the motor into driving relation with the vehicle, said device comprising a tube having an opening therein, means for closing said opening, a propeller in one end of said tube operatively connected to a rotatable element of the vehicle, a normally idle plunger in the other end of said tube operatively connected to the throttle valve of the motor and adapted to be operated by the propeller to control the speed of the motor upon the closing of the opening in said tube, said means for controlling the opening operatively connected to the means for connecting the motor into driving relation with the vehicle.

5. In a device of the type described for synchronizing the speed of a motor of a motorized vehicle with the relative speed of the vehicle while said motor is disconnected from driving relation with said vehicle, means for connecting said motor into driving relation with said vehicle, said device comprising a propeller driven by said vehicle independently of said motor, a housing for said propeller, a plunger in said housing operatively connected to the speed controlling means of the motor, said plunger adapted to be operated by the propeller, and means controlled by the means for connecting the motor with the vehicle adapted to control the operation of said plunger.

6. In combination with a motor driven vehicle, a motor for driving said vehicle, a control for said motor, means for operatively connecting said motor into driving relation with said vehicle while the vehicle is moving independently of the operation of the motor, a control for said means, a synchronizing device adapted to synchronize the speed of the motor with the relative speed of the vehicle during the operation of the control for connecting the motor into driving relation with said vehicle, said device comprising a normally ineffective member operatively connected to the control of said motor and a member constantly operatively connected into driving relation with said vehicle, and a control for said device operatively connected to the control for the connecting means, said control adapted to automatically control the operation of said device upon the operation of the connecting means control.

7. In a motor driven vehicle, a driving unit and a driven unit, a clutch for connecting the driving unit and the driven unit into driving relation with each other, said clutch comprising a member operatively connected to the driving unit and a member operatively connected to the driven unit, a control for said clutch, a synchronizing device normally ineffective to synchronize the speed of the clutch members during the connecting of said driving unit with said driven unit, said device comprising a member operated by a member of the driven unit, a member operatively connected to a control for the driving unit, a control operatively connected to the clutch control to provide the sole means for rendering the synchronizing device effective during the operation of the control for the clutch to connect the driving unit with said driven unit.

8. In a motor driven vehicle, a driving unit and a driven unit, a clutch for connecting the driving unit and the driven unit into driving relation with each other, said clutch comprising a member operatively connected to the driving unit and a member operatively connected to the driven unit, a control for said clutch, a synchronizing device, normally ineffective, to synchronize the speed of the clutch members during the operation of the clutch to connect the driving unit with said driven unit, said device having an element operated by the vehicle independently of the motor, a single control for the synchronizing device operatively connected to said clutch control, whereby upon the operation of the clutch control to connect the driving unit with the driven unit, the synchronizing device is automatically rendered effective to synchronize the driving and driven units.

9. In combination with a motor driven vehicle having clutching means for disengaging the motor from and engaging the motor into driving relation with said vehicle, said means comprising a clutch member operatively connected to the motor and a clutch member operatively connected to the vehicle, a control for said means, and a synchronizing device normally ineffective having an element driven by the vehicle adapted to automatically synchronize the speed of the clutch member connected to the motor with the speed of the clutch member connected to the vehicle upon the operation of the first-mentioned control.

10. In combination with a motor driven vehicle having a clutch for connecting the motor into driving relation with said vehicle, said clutch comprising a member operatively connected to the motor and a member operatively connected to the vehicle, a control for said clutch, a synchronizing device normally ineffective having an element driven by said vehicle and an element operatively connected to said motor to synchronize the speed of the clutch member connected to the motor with the speed of the clutch members connected to the vehicle, and a control for rendering said synchronizing device operative, said control operatively connected to the control for said clutch.

11. In combination with a vehicle, driving means for said vehicle, clutch elements adapted to be brought into engagement for operatively connecting said driving means to said vehicle, a control for one of said clutch elements, a control for said driving means, and a synchronizing device, normally ineffective, having an element driven by the vehicle adapted to synchronize the speed of the clutch elements upon the operation of the clutch control, to engage said clutch elements.

12. In combination with a vehicle, driving means for said vehicle, clutch elements adapted to be brought into engagement for operatively connecting said driving means to said vehicle, a control for one of said clutch elements, a control for said driving means, and a synchronizing device, normally ineffective, adapted to synchronize the speed of the clutch elements during the operation of the clutch control, said device comprising an element driven by said vehicle, an element connected to the control of the driving means and a control connected to the clutch control, whereby said synchronizing device is rendered effective during the engagement of the clutch elements and ineffective during the operation of the vehicle while the clutch elements are disengaged.

13. In combination with a vehicle, driving means for said vehicle, clutch elements adapted to be brought into engagement for operatively connecting said driving means to said vehicle, a control for one of said clutch elements, a control for said driving means, a synchronizing device having an element driven by said vehicle, said device being normally ineffective during the operation of the vehicle while the clutch elements are disengaged and adapted to be rendered effective to synchronize the speed of the clutch elements during the operation of the clutch control to engage the clutch elements.

14. In combination with a motor driven vehicle, a motor for driving said vehicle, a control for said motor, means comprising a clutch, for operatively connecting said motor into driving relation with said vehicle, a control for one of said clutch elements, a synchronizing device having an element driven by the vehicle adapted to synchronize the speed of the clutch elements during the operation of said clutch element control to connect the motor into driving relation with the vehicle, a control for said synchronizing device operatively connected to the clutch control for rendering said synchronizing device effective during the engagement of the clutch elements and ineffective while the clutch elements are disengaged thereby permitting the clutch elements to operate at different speeds during their disengagements.

HUGO RUDYARD HUSTAD.

CERTIFICATE OF CORRECTION.

Patent No. 2,059,641.  November 3, 1936.

Hugo Rudyard Hustad.

It is hereby certified that error appears in the above numbered patent requiring correction as follows: In the drawing, strike out Figure 3, and insert instead the following:

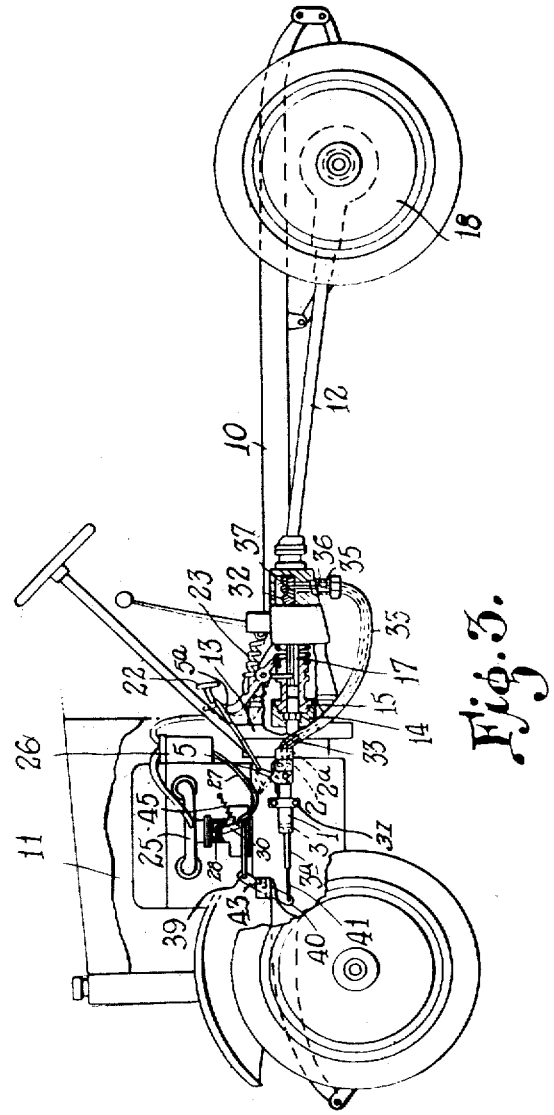

and that the said Letters Patent should be read with this correction therein that the same may conform to the record of the case in the Patent Office.

Signed and sealed this 16th day of March, A.D. 1937.

(Seal)

Henry Van Arsdale
Acting Commissioner of Patents.